(12) United States Patent
Ohseki et al.

(10) Patent No.: US 12,401,137 B2
(45) Date of Patent: Aug. 26, 2025

(54) TERMINAL DEVICE, NETWORK NODE, AND CONTROL METHOD FOR COMMUNICATION CONTROL WITH CONSIDERATION GIVEN TO ANTENNA ARRANGEMENT

(71) Applicant: KDDI Research, Inc., Fujimino (JP)

(72) Inventors: Takeo Ohseki, Fujimino (JP); Issei Kanno, Fujimino (JP); Shunsuke Kamiwatari, Fujimino (JP); Kosuke Yamazaki, Fujimino (JP)

(73) Assignee: KDDI Research, Inc., Fujimino (JP)

( * ) Notice: Subject to any disclaimer, the term of this patent is extended or adjusted under 35 U.S.C. 154(b) by 0 days.

(21) Appl. No.: 18/897,337

(22) Filed: Sep. 26, 2024

(65) Prior Publication Data

US 2025/0015516 A1    Jan. 9, 2025

Related U.S. Application Data

(63) Continuation of application No. PCT/JP2023/006707, filed on Feb. 24, 2023.

(30) Foreign Application Priority Data

Mar. 29, 2022  (JP) ................. 2022-053611

(51) Int. Cl.
*H01Q 21/28* (2006.01)
*H04L 5/00* (2006.01)

(52) U.S. Cl.
CPC .......... *H01Q 21/28* (2013.01); *H04L 5/0048* (2013.01)

(58) Field of Classification Search
CPC ...................................... H01Q 21/28
See application file for complete search history.

(56) References Cited

U.S. PATENT DOCUMENTS

| | | |
|---|---|---|
| 2021/0281294 A1 | 9/2021 | Takano |
| 2022/0166468 A1 | 5/2022 | Go et al. |

FOREIGN PATENT DOCUMENTS

| | | |
|---|---|---|
| WO | WO-2018/187416 A1 | 10/2018 |
| WO | WO-2020/031762 A1 | 2/2020 |
| WO | WO-2020/209597 A1 | 10/2020 |
| WO | WO-2021/028115 A1 | 2/2021 |

OTHER PUBLICATIONS

Extended European Search Report for EP 23779102.5 dated May 23, 2025 (7 pages).

*Primary Examiner* — Graham P Smith
(74) *Attorney, Agent, or Firm* — Foley & Lardner LLP

(57) ABSTRACT

A terminal device that comprises a plurality of antennas notifies a network to which the terminal device belongs of information according to which it is possible to specify at least one of, among the plurality of antennas, a second antenna having a predetermined characteristic in common with a first antenna included in the plurality of antennas, and a third antenna not having the predetermined characteristic in common with the first antenna.

14 Claims, 5 Drawing Sheets

TERMINAL DEVICE, NETWORK NODE, AND CONTROL METHOD FOR COMMUNICATION CONTROL WITH CONSIDERATION GIVEN TO ANTENNA ARRANGEMENT

CROSS-REFERENCE TO RELATED APPLICATION(S)

This application is a continuation of International Patent Application No. PCT/JP2023/006707 filed on Feb. 24, 2023, which claims priority to and the benefit of Japanese Patent Application No. 2022-053611, filed on Mar. 29, 2022, the entire disclosures of which are incorporated herein by reference.

BACKGROUND OF THE INVENTION

Field of the Invention

The present invention relates to a communication control technology according to an arrangement of antennas in a terminal device.

Description of the Related Art

In accordance with the standard of the Third Generation Partnership Project (3GPP), wireless communication systems are widely used in which a plurality of geographically distributed base station devices provide a wireless communication service to a terminal device within a range of electromagnetic waves transmitted by each base station device. In such a wireless communication system, various types of communication control are performed according to the state of a transmission path between an antenna of the base station device and an antenna of the terminal device.

In response to wireless communication being used in a variety of situations, the configurations of terminal devices are becoming more diverse. For example, not only small terminal devices such as conventional mobile phones, but also terminal devices mounted on large objects such as vehicles can be used. In addition, in fixed wireless access (FWA) using a cellular communication system, a wireless device on the user side can be used as a terminal device of the cellular communication system.

Conventionally, when a terminal device has a plurality of antennas, it is assumed that all of these antennas are arranged inside a small terminal device, and therefore the characteristics of the transmission paths between the plurality of antennas and the antenna of the base station device are generally treated as being the same. On the other hand, as terminal devices become more diverse, it is assumed that the plurality of antennas of the terminal devices are arranged at locations spaced apart from each other, and the characteristics of the transmission paths between the plurality of antennas and the antenna of the base station device will differ significantly. In such a case, if the characteristics of the transmission paths in the plurality of antennas of the terminal device are treated as being generally the same, it is difficult to obtain sufficient communication quality.

SUMMARY OF THE INVENTION

The present invention provides a method for enabling execution of appropriate communication control corresponding to an arrangement of antennas in a terminal device.

A terminal device according to one aspect of the present invention is a terminal device comprising: a plurality of antennas; at least one processor; and at least one memory that stores a computer-readable instruction for causing, when executed by the at least one processor, the at least one processor to: notify a network to which the terminal device belongs of information according to which it is possible to specify at least one of, among the plurality of antennas, a second antenna having a predetermined characteristic in common with a first antenna included in the plurality of antennas, and a third antenna not having the predetermined characteristic in common with the first antenna.

A network node according to one aspect of the present invention is a network node comprising: at least one processor; and at least one memory that stores a computer-readable instruction for causing, when executed by the at least one processor, the at least one processor to: acquire, from a terminal device belonging to a network including the network node, information according to which it is possible to specify at least one of, among a plurality of antennas included in the terminal device, a second antenna having a predetermined characteristic in common with a first antenna included in the plurality of antennas, and a third antenna not having the predetermined characteristic in common with the first antenna; and perform, based on the information, control of communication of the terminal device, the control being the same for the first antenna and the second antenna, and the control being different for the first antenna and the third antenna.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
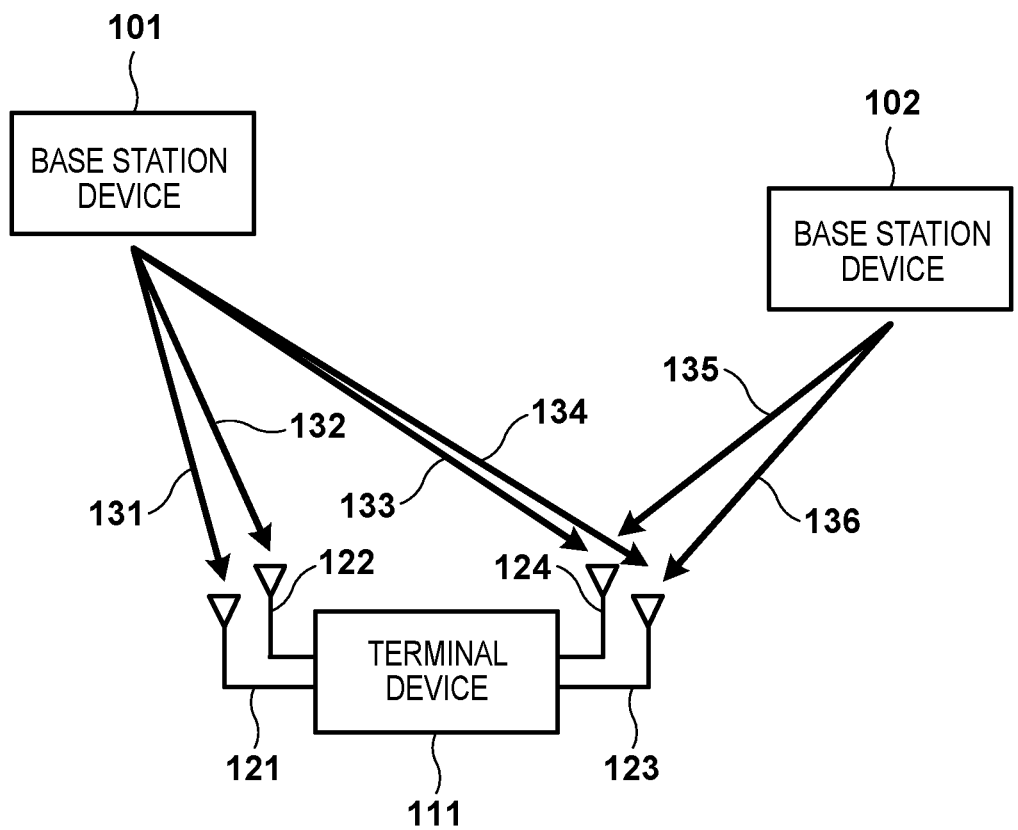
FIG. 1 is a diagram illustrating an example of a system configuration.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 shows an example of a configuration of a wireless communication system according to this embodiment. The wireless communication system may be, for example, a cellular communication system conforming to the fifth generation (5G) standard standardized by the 3rd Generation Partnership Project (3GPP). However, this is just one example, and the following discussion may also be applied to wireless communication systems conforming to conventional standards such as Long Term Evolution (LTE), standards from the sixth generation and onward, or the like, and may also be applied to wireless communication systems other than cellular communication systems.

This wireless communication system includes, for example, a base station device 101 and a terminal device 111. Note that the base station device 101 is a wireless access network node connected to a core network, and the network may of course also include other network nodes, but for simplicity of description, such configurations are omitted in FIG. 1. Here, it is assumed that the terminal device 111 has a plurality of (at least two) antennas, and that among the plurality of antennas, an antenna 121 and an antenna 122 are arranged at positions spaced significantly apart from an antenna 123 and an antenna 124. In this case, it is assumed that the antenna 121 and the antenna 122 have roughly the same characteristics with respect to the electromagnetic waves arriving from the base station device 101. For example, the reception timings of electromagnetic waves received by the antenna 121 and the antenna 122 are roughly the same, the same settings can be used for downlink reception timing control, such as timing control for Fourier transform, and the same settings can be used for uplink transmission timing control, such as timing advance. That is, in the communication via the antenna 121 and the antenna 122, common communication timing control (timing control in at least one of the uplink and the downlink) can be used. Similarly, the antenna 123 and the antenna 124 are assumed to have roughly the same characteristics with respect to electromagnetic waves arriving from the base station device 101, and for example, common communication timing control can be applied to them. On the other hand, it can be assumed that the antenna 121 or antenna 122 and the antenna 123 or antenna 124 have different characteristics from each other. For this reason, if common communication timing control is applied to the antenna 121 and the antenna 123, it may be impossible to perform communication appropriately. For example, in the downlink, a Fourier transform window setting that is appropriate for the antenna 121 may not be appropriate for the antenna 123, making it impossible to ensure orthogonality.

Also, for example, the terminal device 111 can use a plurality of panels to communicate with different transmission and reception points within the network. In this case, since it is assumed that the characteristics will differ significantly from panel to panel, it may not be appropriate to use a common setting for communication using a plurality of panels. Note that although separate settings can be applied to each of the plurality of antennas, the processing can become more complicated as the number of antennas increases.

For this reason, in this embodiment, when electromagnetic waves arriving from the base station device 101 are detected via a plurality of antennas, it is possible to decide whether to apply the same setting control or a different setting control depending on whether or not the respective predetermined characteristics are the same as each other. For this reason, the terminal device 111 notifies the base station device 101 (a network node within the network) of, for example, information that enables the base station device 101 to specify at least one of a second antenna that has a predetermined characteristic in common with a first antenna among the plurality of antennas that are included in the terminal device 111, and a third antenna that does not have the predetermined characteristic in common. For example, the terminal device 111 can notify the base station device 101 that the antenna 121 and the antenna 122 have a predetermined characteristic in common. In addition, the terminal device 111 may notify the base station device 101 that the antenna 121 does not have the predetermined characteristic in common with the antenna 123 and the antenna 124. Also, the terminal device 111 may notify the base station device 101 that, for example, the antenna 121 and the antenna 122 belong to a first group, and the antenna 123 and the antenna 124 belong to a second group. In this case, it can be indicated that two antennas in the same group have a predetermined characteristic in common with each other, and two antennas in different groups do not have a predetermined characteristic in common with each other. Based on this notification, the network node (e.g., base station device 101) performs setting and control of communication that is the same for an antenna group that has the predetermined characteristic in common, and performs setting and control of communication independently for an antenna group that does not have the predetermined characteristic in common.

In one example, the predetermined characteristic relates to the magnitude of delay observed in electromagnetic waves arriving from the base station device 101 and the base station device 102. In addition, the predetermined characteristic may relate to the magnitude of delay until electromagnetic waves transmitted from the antennas 121 to 124 of the terminal device 111 arrive at the base station device 101 or the base station device 102. Note that in the following, for example, for a predetermined antenna of the terminal device 111, the magnitude of delay at that particular antenna is expressed by including the magnitude of delay observed by the terminal device 111 in the downlink and the magnitude of delay observed by the base station device 101 or the base station device 102 in the uplink. In this case, based on the differences between the magnitude of delay at the antenna 121 and the magnitudes of delay at the other antennas, an antenna for which the difference does not exceed a predetermined value is treated as an antenna that has the predetermined characteristic in common with the antenna 121. In addition, an antenna for which the difference exceeds the predetermined value can be treated as an antenna that does not have the predetermined characteristic in common with the antenna 121. Note that the magnitude of the delay in this context can be the average value of the time difference between when electromagnetic waves transmitted from the base station device 101 or the base station device 102 arrive at the terminal device 111 for each antenna. In addition, the magnitude of the delay at each antenna may be specified using the timing at which the electromagnetic waves arrive at any one of the antennas as a criterion.

The network node can apply the same communication timing control to a group of antennas in which the timing at which electromagnetic waves transmitted from the base station device 101 or the base station device 102 arrive at the terminal device 111 is sufficiently close, that is, a group of antennas that have the same characteristic regarding the magnitude of delay. On the other hand, if the network node applies the same communication timing control to an antenna group that do not have the characteristic regarding the magnitude of delay in common, it may be difficult to ensure orthogonality, and therefore the network node can apply independent communication timing controls to these antennas. The communication timing control can include, for example, setting the timing advance used when transmitting an uplink signal. In addition, the network node can notify the terminal device 111 of setting information that enables execution of different reception controls, for example, setting Fourier transform windows corresponding to different timings, for the antennas 121 and 122 and the antennas 123 and 124. In addition, the network node can perform the same setting and control of uplink transmission power control for an antenna group that has a characteristic related to the magnitude of delay in common, and can independently perform setting and control of uplink transmission power control for an antenna group that has different characteristics related to the magnitude of delay. It is assumed that antennas with significantly different average delays will have different magnitudes of propagation loss due to the difference in the magnitude of the average delay. For this reason, common transmission power control can be set and controlled for an antenna group that has roughly the same average delay, and transmission power control can be set and controlled independently for an antenna group that does not have the same average delay.

In one example, the predetermined characteristic relates to the magnitude of delay spread observed for electromagnetic waves arriving at the base station device 101 or the base station device 102 from each of the antennas 121 to 124 of the terminal device 111. In this case, based on the difference between the magnitude of the delay spread for the antenna 121 and the magnitude of the delay spread for other antennas, an antenna for which the difference does not exceed a predetermined value is treated as an antenna that has the predetermined characteristic in common with the antenna 121. In addition, an antenna for which the difference exceeds the predetermined value can be treated as an antenna that does not have the predetermined characteristic in common with the antenna 121. In addition, when a correlation value between the shape of the delay spread for the antenna 121 and the shape of the delay spread is calculated, an antenna for which the correlation value exceeds a predetermined value may be treated as an antenna that has the predetermined characteristic in common with the antenna 121. In addition, an antenna for which the correlation value does not exceed a predetermined value can be treated as an antenna that does not have the predetermined characteristic in common with the antenna 121.

A network node can give, for example, the same Sounding Reference Signal (SRS) setting to an antenna group that has the delay spread characteristic in common. On the other hand, the SRS setting can be applied independently to an antenna group that does not have the delay spread characteristic in common. Here, the SRS setting can include, for example, setting of the density of frequency resources over which the SRS is to be transmitted. That is, the number of subcarriers on which the SRS is transmitted can be set to be different for each of the plurality of antennas of the terminal device 111. In this way, a common SRS setting is applied to an antenna group that has the delay spread characteristic in common, and separate settings are applied independently to an antenna group that does not have the delay spread characteristic in common, whereby an SRS setting appropriate for the transmission path can be used for each of the plurality of antennas with significantly different transmission path conditions.

In addition, in one example, the predetermined characteristic relates to the direction in which the electromagnetic waves transmitted from the base station device 101 or the base station device 102 arrive at the terminal device 111. In this case, based on the difference between the direction of arrival of electromagnetic waves at the antenna 121 and the direction of arrival of electromagnetic waves at other antennas, an antenna for which the difference does not exceed a predetermined value is treated as an antenna that has the predetermined characteristic in common with the antenna 121. In addition, an antenna for which the difference exceeds the predetermined value can be treated as an antenna that does not have the predetermined characteristic in common with the antenna 121. The network node can use the same settings and controls for beam control for an antenna group that has the characteristic of the direction of arrival of electromagnetic waves in common. On the other hand, settings and controls for beam control can be applied independently to an antenna group that does not have the characteristic of the direction of arrival of electromagnetic waves in common. Here, the settings for beam control may include, for example, a channel state information-reference signal (CSI-RS) setting.

Note that the above-mentioned predetermined characteristic can be specified in a fixed manner depending on the installation positions of the antennas 121 to 124 in the terminal device 111. For example, as shown in FIG. 1, if the antenna 121 and the antenna 122 are located sufficiently close to each other and are located at different positions from the antenna 123 and the antenna 124, the antenna 121 and the antenna 122 can be treated as having the predetermined characteristic in common. Similarly, the antenna 123 and the antenna 124 can be treated as having the predetermined characteristic in common. On the other hand, the antenna 121, the antenna 123, and the antenna 124 can be treated as not having the predetermined characteristic in common, and the antenna 122, the antenna 123, and the antenna 124 can also be treated as not having the predetermined characteristic in common. Note that the terminal device 111 may notify the network of information indicating which characteristics are held in common or not among the above-mentioned predetermined characteristics, together with the above-mentioned information. Note that this notification can be given as capability information (UE Capability), for example. In this case, the terminal device 111 can perform notification of the above-mentioned capabilities by, for example, transmitting a message (UECapabilityInformation) performing notification of the capability information to the base station device 101 in response to a capability information inquiry message (UECapabilityEnquiry) from the base station device 101. In addition, the base station device 101 can set, for example, a radio resource control (RRC) layer based on the acquired information, and can also execute setting and control of the terminal device 111 using, for example, downlink control information (DCI) or the like.

Device Configuration

Figure 2:
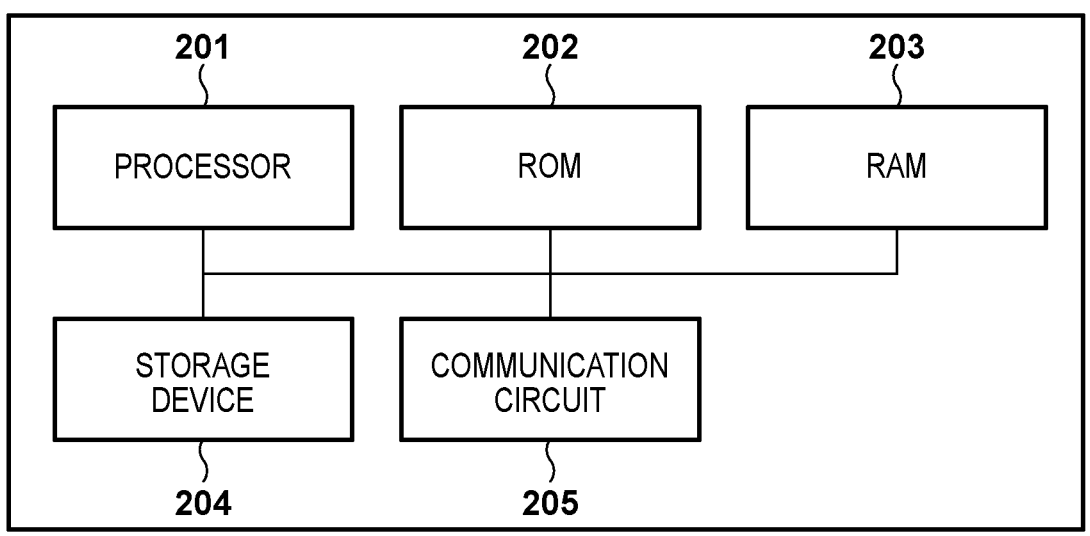
FIG. 2 is a diagram illustrating an example of a hardware configuration of a device.

Next, the configurations of the base station device 101 and the terminal device 111 that execute the above-mentioned processing will be described. FIG. 2 is a diagram illustrating an example of the hardware configuration of the base station device 101 and the terminal device 111. In one example, the base station device 101 and the terminal device 111 include a processor 201, a ROM 202, a RAM 203, a storage device 204, and a communication circuit 205. The processor 201 is a computer including one or more processing circuits, such as a general-purpose CPU (Central Processing Unit) or an ASIC (Application Specific Integrated Circuit), and executes the overall processing of the device and each of the above-mentioned processes by reading out and executing programs stored in the ROM 202 or the storage device 204. The ROM 202 is a read-only memory that stores information such as programs related to the processes executed by the base station device 101 and the terminal device 111, and various parameters. The RAM 203 is a random access memory that functions as a workspace when the processor 201 executes a program, and the RAM 203 stores temporary information. The storage device 204 is constituted by, for example, a removable external storage device or the like. The communication circuit 205 includes, for example, a circuit for communicating with another device. Note that although FIG. 2 illustrates one communication circuit 205, the base station device 101 and the terminal device 111 can have a plurality of communication circuits. Note that the terminal device 111 of this embodiment may include a plurality of antennas, the plurality of antennas may be connected to one communication circuit 205, or one or more of the plurality of antennas may be connected to one communication circuit 205 and the other antennas may be connected to another communication circuit 205.

Figure 3:
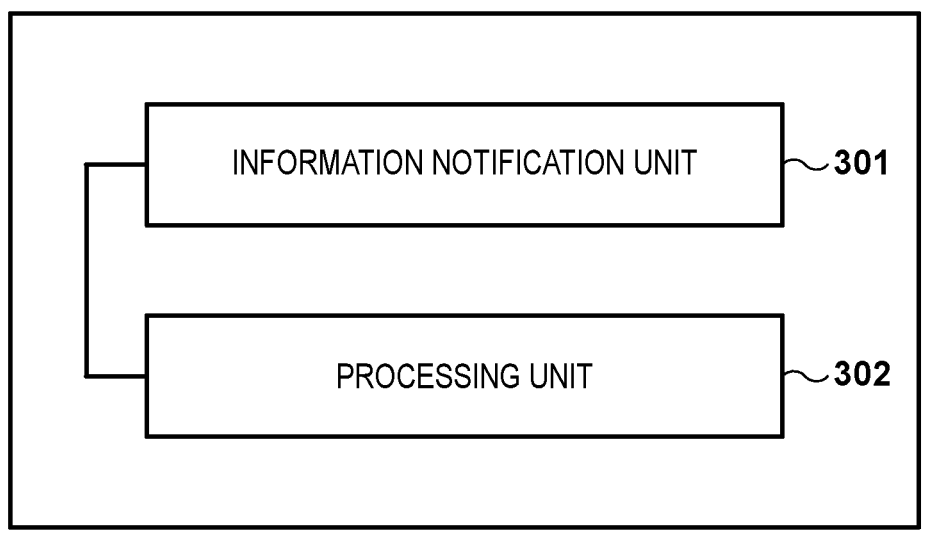
FIG. 3 is a diagram illustrating an example of a functional configuration of a terminal device.

FIG. 3 is a diagram showing an example of a functional configuration of the terminal device 111. The terminal device 111 includes, for example, an information notification unit 301 and a processing unit 302. The functions illustrated in FIG. 3 can be realized, for example, by the processor 201 executing a program stored in the ROM 202 or the storage device 204. Note that this is just one example, and some or all of the functions shown in FIG. 3 may be realized by dedicated hardware. Also, FIG. 3 shows only the functions related to this embodiment among the functions of the terminal device 111, and the terminal device 111 can of course have functions other than those shown in FIG. 3, such as functions naturally included in a terminal device in a cellular communication system.

The information notification unit 301 notifies the base station device 101 (network) of information by which it is possible to specify at least one of a combination of antennas that have a predetermined characteristic in common and a combination of antennas that do not have the predetermined characteristic in common among the plurality of antennas included in the terminal device 111, for example, as described above. Note that in addition to that information, the information notification unit 301 may notify the base station device 101 of information specifying the predetermined characteristic. For example, the information notification unit 301 can notify the base station device 101 of information designating a predetermined characteristic such as average delay, delay spread, and direction of arrival of electromagnetic waves, and information by which it is possible to specify at least one of a combination of antennas that have the predetermined characteristic in common and a combination of antennas that do not have the predetermined characteristic in common. Note that if information regarding one of the plurality of types of predetermined characteristics that is to be subjected to notification is determined in advance, the information notification unit 301 does not need to notify the base station device 101 of the information indicating the predetermined characteristic. The processing unit 302 receives instruction information for control and setting from the base station device 101 and executes setting processing and control processing based on the instruction information.

Figure 4:
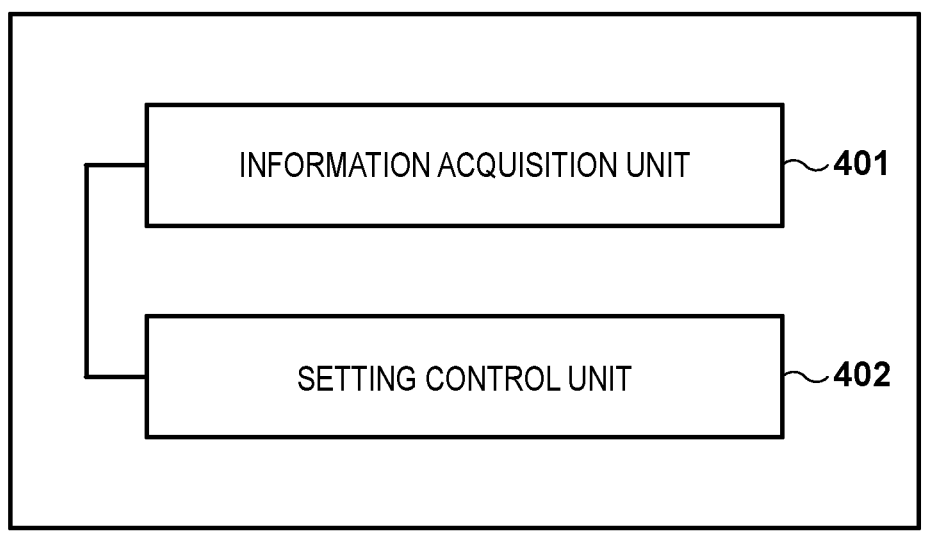
FIG. 4 is a diagram illustrating an example of a functional configuration of a base station device.

FIG. 4 is a diagram illustrating an example of a functional configuration of the base station device 101. The base station device 101 includes, for example, an information acquisition unit 401 and a setting control unit 402. The functions illustrated in FIG. 4 can be realized, for example, by the processor 201 executing a program stored in the ROM 202 or the storage device 204. Note that this is just one example, and some or all of the functions shown in FIG. 4 may be realized by dedicated hardware. In addition, FIG. 4 shows only the functions related to this embodiment among the functions included in the base station device 101, and the base station device 101 can of course have functions other than those shown in FIG. 4, such as functions naturally included in a base station device in a cellular communication system.

The information acquisition unit 401 acquires information from the terminal device 111 according to which it is possible to specify at least one of a combination of antennas that have the predetermined characteristic in common and a combination of antennas that do not have the predetermined characteristic in common among the plurality of antennas included in the terminal device 111. In addition, if information regarding one of the plurality of types of predetermined characteristics that is to be subjected to notification is not determined in advance, the information acquisition unit 401 can acquire information designating information relating to one of the predetermined characteristics, according to which it is possible to specify at least one of a combination of antennas that have the predetermined characteristic in common and a combination of antennas that do not have the predetermined characteristic in common. The setting control unit 402 executes setting and control of the terminal device 111 based on the information acquired by the information acquisition unit 401.

Flow of Processing

Next, an example of a flow of processing executed between the base station device 101 and the terminal device 111 will be described.

Figure 5:
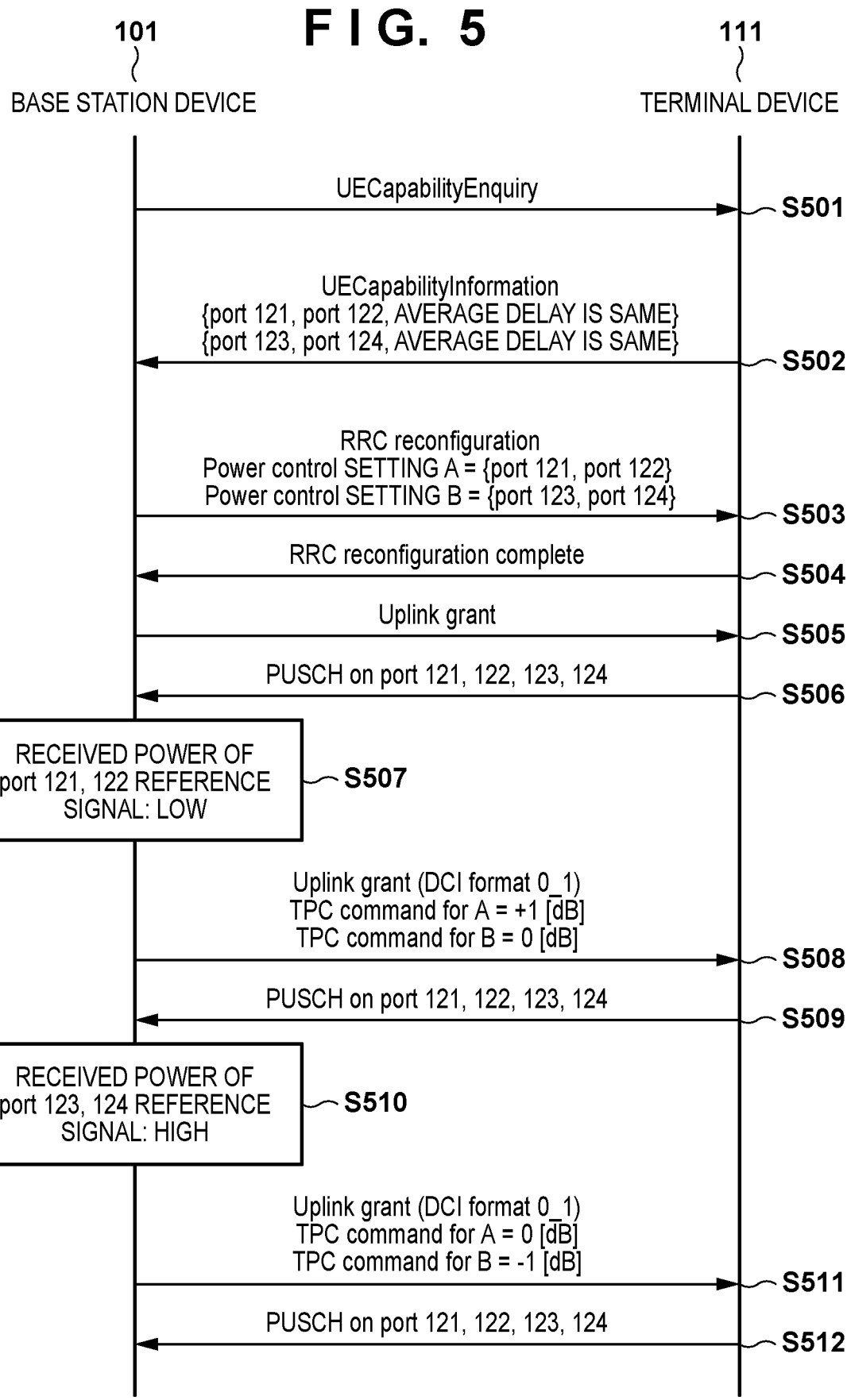
FIG. 5 is a diagram illustrating an example of a flow of processing executed in the system.

FIG. 5 shows an example of a flow of processing relating to uplink transmission power control when the predetermined characteristic relates to an average delay. In this processing, first, for example, when the terminal device 111 is in a connected state, the base station device 101 transmits a message inquiring about capability information to the terminal device 111 (step S501). Then, in response to the message, the terminal device 111 notifies the base station device 101 of capability information of the terminal device 111 (step S502). At this time, the terminal device 111 can notify the base station device 101 that the average delay characteristic when electromagnetic waves arrive from the base station device 101 is the same for the antennas 121 and 122, and similarly, the average delay characteristic is the same for the antennas 123 and 124. Note that if it is determined in advance that antennas will be classified based on the average delay characteristic, notification that the predetermined characteristic is a characteristic related to the average delay may be omitted. In this case, the terminal device 111 may notify the base station device 101 only of information indicating that the antenna 121 and the antenna 122 are an antenna group that has the predetermined characteristic in common, and that the antenna 123 and the antenna 124 are an antenna group that has the predetermined characteristic in common. In addition, the terminal device 111 may notify the base station device 101 that the antenna 121 (or the antenna 122) and the antennas 123 and 124 do not have the predetermined characteristic in common.

The base station device 101 executes setting and control of communication of the terminal device 111, based on the information received in step S502. For example, the base station device 101 sets the transmission power control for the antennas 121 and 122 and sets the transmission power control for the antennas 123 and 124 separately. The base station device 101 transmits, for example, an RRC reconfiguration message including a transmission power setting for each antenna group to the terminal device 111 (step S503). In response to this, the terminal device 111 transmits an RRC reconfiguration complete message to the base station device 101 (step S504), and ends the setting. Note that a conventional terminal device cannot perform notification of information according to which it is possible to specify at least one of an antenna group that has the predetermined characteristic in common and an antenna group that does not have the predetermined characteristic in common, as in step S502. For this reason, the base station device 101 performs one common setting for the plurality of antennas for such a conventional terminal device, regardless of the arrangement or the like of the antennas. In contrast, in this embodiment, the base station device 101 can determine, based on information obtained from the terminal device 111, whether or not a common setting can be used for each of the antennas included in the terminal device 111, and can execute setting control based on the result of that determination.

Thereafter, the base station device 101 allocates, for example, frequency and time resources for uplink signal transmission to the terminal device (step S505), and the terminal device 111 transmits uplink data (Physical Uplink Shared Channel, PUSCH) using each antenna based on the allocation (step S506). The base station device 101 determines whether transmission power control is necessary for each antenna included in the terminal device 111, for example, by measuring a predetermined signal, such as a demodulation reference signal (DM-RS), among the signals transmitted from the antennas 121 to 124. Here, it is assumed that the base station device 101 has determined that the received power of the DM-RS transmitted from the antenna 121 and the antenna 122 is low and that the transmission power is to be increased (step S507). In this case, the base station device 101 increases the transmission power of the antenna 121 and the antenna 122, while transmitting an instruction to the terminal device 111 to keep the transmission power of the antenna 123 and the antenna 124 unchanged. For example, the base station device 101 can transmit such an instruction included in downlink control information (DCI) that allocates resources for uplink data transmission to the terminal device 111 (step S508). Note that, for example, information in which identification information allocated to each setting in step S503 ("A" or "B" in FIG. 5) is associated with a transmission power control command can be transmitted to the terminal device 111. Upon receiving this instruction, the terminal device 111 increases the transmission power of the antenna 121 and the antenna 122, and transmits uplink data with the allocated resources, using each antenna (step S509).

When receiving this uplink data, the base station device 101 also monitors the DM-RS and continuously executes the transmission power according to the reception power. Here, it is assumed that the base station device 101 has determined that the reception power of the DM-RS transmitted from the antenna 123 and the antenna 124 is high and that the transmission power is to be reduced (step S510). In this case, the base station device 101 transmits an instruction to the terminal device 111 to reduce the transmission power of the antenna 123 and the antenna 124, while keeping the transmission power of the antenna 121 and the antenna 122 unchanged. For example, the base station device 101 can transmit such an instruction included in downlink control information (DCI) that allocates resources for uplink data transmission to the terminal device 111 (step S511). Then, upon receiving this instruction, the terminal device 111 reduces the transmission power of the antenna 123 and the antenna 124, and transmits uplink data with the allocated resources, using each antenna (step S512).

Note that although FIG. 5 shows an example in which the increase in transmission power of the antenna 121 and the antenna 122 and the decrease in transmission power of the antenna 123 and the antenna 124 are performed at different timings, these controls may be performed simultaneously. For example, the base station device 101 can transmit, to the terminal device 111, a DCI including an instruction to increase the transmission power of the antenna 121 and the antenna 122 and decrease the transmission power of the antenna 123 and the antenna 124. Note that it is sufficient that the antennas 121 and 122 and the antennas 123 and 124 are controlled independently, and instructions may be given to increase or decrease the transmission power for all of these antennas. However, in this case as well, the instruction can be transmitted for each antenna group having a predetermined characteristic in common.

The above-mentioned processing makes it possible to appropriately control the transmission power for each antenna, and to improve the efficiency of communication.

Figure 6:
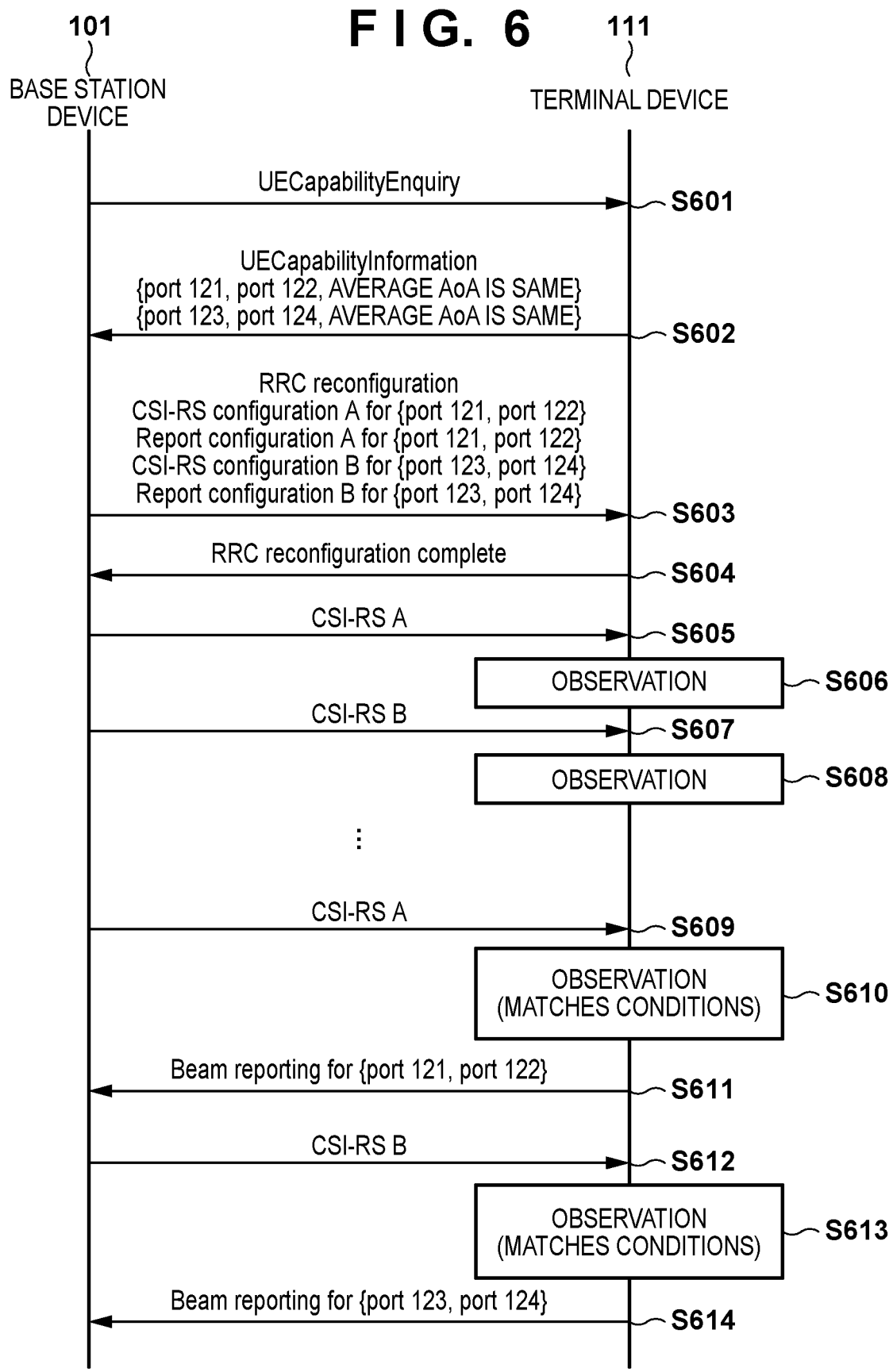
FIG. 6 is a diagram illustrating an example of a flow of processing executed in the system.

FIG. 6 shows an example of a flow of setting control processing related to reporting of a beam in the case where the predetermined characteristic relates to the direction in which electromagnetic waves from the base station device 101 arrive at the terminal device 111. In this processing, similarly to the case of FIG. 5, first, the base station device 101 transmits a message inquiring about capability information to the terminal device 111 (step S601). Then, in response to the message, the terminal device 111 notifies the base station device 101 of the capability information of the terminal device 111 (step S602). At this time, the terminal device 111 can notify the base station device 101 that the antennas 121 and 122 have the characteristic of the direction (Angle of Arrival, AoA) in which electromagnetic waves arrive from the base station device 101 in common, and that the antennas 123 and 124 similarly have the AoA characteristic in common. Note that if it is determined in advance that antenna classification will be performed based on the AoA characteristic, notification that the predetermined characteristic is a characteristic related to AoA may be omitted.

The base station device 101 executes setting and control of communication of the terminal device 111, based on the information received in step S602. The base station device 101 transmits, for example, an RRC reconfiguration message including settings for beam control and management for each antenna group to the terminal device 111 (step S603). In response to this, the terminal device 111 transmits an RRC reconfiguration complete message to the base station device 101 (step S604), and ends the setting. The base station device 101 notifies the terminal device 111 of a channel state information-reference signal (CSI-RS) setting and a reporting setting therefor, for example, as settings necessary for beam control and management, for each antenna group that has the predetermined characteristic in common. Note that in this processing, for conventional terminal devices, one common setting is made for a plurality of antennas regardless of their arrangement. In contrast, in this embodiment, the base station device 101 can specify, based on information obtained from the terminal device 111, whether or not a common setting can be used for each of the antennas included in the terminal device 111, and can execute setting control based on the result of that specification.

Thereafter, the base station device 101 transmits, for example, a CSI-RS corresponding to the settings for the antennas 121 and 122 (step S605), and the terminal device 111 measures the CSI-RS using the antennas 121 and 122 (step S606). Note that the terminal device 111 can be configured not to perform measurement using the antennas 123 and 124 for this CSI-RS. In addition, the base station device 101 transmits, for example, a CSI-RS corresponding to the settings for the antennas 123 and 124 (step S607), and the terminal device 111 measures the CSI-RS using the antennas 123 and 124 (step S608). Note that the terminal device 111 can be configured not to perform measurement using the antennas 121 and 122 for this CSI-RS. The terminal device 111 continuously executes CSI-RS measurement based on a first setting relating to the antennas 121 and 122, using the antennas 121 and 122 (step S609). Then, if the measurement result satisfies a condition designated by a report setting relating to the antennas 121 and 122 (step S610), the terminal device 111 notifies the base station device 101 of the measurement result (step S611). Similarly, the terminal device 111 continuously executes CSI-RS measurement based on a second setting relating to the antennas 123 and 124, using the antennas 123 and 124 (step S612). Then, if the measurement result satisfies a condition designated by the report setting for the antennas 123 and 124 (step S613), the terminal device 111 notifies the base station device 101 of the measurement result (step S614).

Based on the notified measurement result, the base station device 101 performs beam control and management in the conventional manner. By performing such processing, it is possible to appropriately control and manage beams for each antenna, thereby improving communication efficiency.

Figure 7:
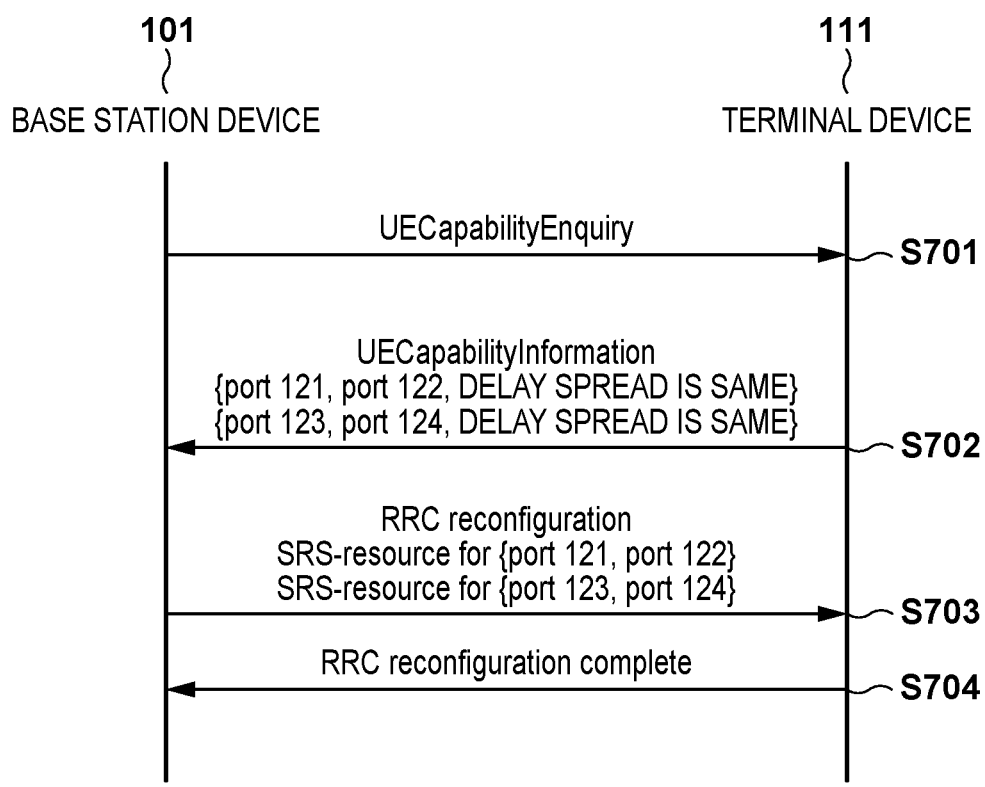
FIG. 7 is a diagram illustrating an example of a flow of processing executed in the system.

FIG. 7 shows an example of a flow of setting control processing for a sounding reference signal in a case where the predetermined characteristic relates to delay spread. In this processing as well, similarly to the cases of FIGS. 5 and 6, first, the base station device 101 transmits a message inquiring about capability information to the terminal device 111 (step S701). Then, in response to the message, the terminal device 111 notifies the base station device 101 of the capability information of the terminal device 111 (step S702). At this time, the terminal device 111 can notify the base station device 101 that the delay spread characteristics when the electromagnetic waves transmitted from the antennas 121 and 122 arrive at the base station device 101 are the same, and that the delay spread characteristics of the antennas 123 and 124 are the same. Note that if it is determined in advance that antenna classification will be performed based on the delay spread characteristics, notification that the predetermined characteristic is a characteristic relating to AoA may be omitted.

The base station device 101 executes setting and control of communication of the terminal device 111, based on the information received in step S702. The base station device 101 transmits, for example, an RRC reconfiguration message including a setting of a sounding reference signal (SRS) for each antenna group to the terminal device 111 (step S703). In response to this, the terminal device 111 transmits an RRC reconfiguration complete message to the base station device 101 (step S704), and ends the setting. The base station device 101 can set, for example, the subcarrier spacing for transmitting the SRS (the density of the SRS on the frequency axis) separately for the antennas 121 and 122 and the antennas 123 and 124. Thereafter, the terminal device 111 uses the antennas 121 and 122 to transmit the SRS based on a first SRS setting for those antennas, and uses the antennas 123 and 124 to transmit the SRS based on a second SRS setting for those antennas. This makes it possible to suppress the deterioration of efficiency caused by using a common setting for antennas for which the states of the transmission paths are expected to differ greatly. Note that in this processing as well, for a conventional terminal device, one common setting is made for a plurality of antennas regardless of their arrangement. In contrast, in this embodiment, the base station device 101 can specify, based on information obtained from the terminal device 111, whether or not a common setting can be used for the antennas included in the terminal device 111, and can execute setting control based on the result of that specification.

Note that the processing shown in FIGS. 5 to 7 is merely an example, and processing other than the setting and control processing shown may also be executed. Also, in FIGS. 5 to 7, it has been described that the antennas are classified according to the average delay, AoA, and delay spread, but in reality, these can be decided on by only the arrangement of the antennas. That is, antennas whose inter-antenna distance is within a predetermined range can be treated as a group having a characteristic in common, and antennas whose inter-antenna distance exceeds the predetermined range can be treated as having different characteristics. In addition, the distance and positional relationship of the antenna arrangement may be associated in advance with whether or not there is commonality of a predetermined characteristic, and based on the characteristic used for setting control, the terminal device may notify the network of at least one of an antenna group for which common setting control is to be performed and an antenna group for which independent setting control is to be performed. For example, in the above example, it is assumed that the antennas 121 and 122 have a characteristic in common, and the antennas 123 and 124 have characteristics different from the antennas 121 and 122, but have a characteristic in common between the antennas 123 and 124, but there is no limitation to this. For example, with regard to the average delay, the antennas 121 and 122 may have a characteristic in common, and the antennas 123 and 124 may have a characteristic in common, while with regard to the delay spread, the antennas 121 and 124 may have a characteristic in common, and the antennas 122 and 123 may have a characteristic in common, or the like. In this manner, the plurality of antennas are classified into antenna groups each including one or more antennas, but the classification may vary according to a predetermined characteristic.

In this manner, it becomes possible to perform appropriate communication control in response to the diversification of antenna arrangements in terminal devices. This enables contribution to Goal 9 of the United Nations Sustainable Development Goals (SDGs), which is to "build resilient infrastructure, promote sustainable industrialization and foster innovation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal device comprising:
a plurality of antennas;
at least one processor; and
at least one memory that stores a computer-readable instruction for causing, when executed by the at least one processor, the at least one processor to:
notify a network to which the terminal device belongs of information that identifies at least one of, among the plurality of antennas, a second antenna having a predetermined characteristic in common with a first antenna included in the plurality of antennas, and a third antenna not having the predetermined characteristic in common with the first antenna.

2. The terminal device according to claim 1,
wherein the terminal device notifies the network of the predetermined characteristic as well as the information.

3. The terminal device according to claim 1,
wherein the predetermined characteristic relates to a magnitude of delay observed regarding electromagnetic waves that arrive from a base station device belonging to the network or a magnitude of delay obtained regarding electromagnetic waves that arrive at the base station device from the terminal device.

4. The terminal device according to claim 1,
wherein the predetermined characteristic relates to a magnitude of delay spread observed regarding electromagnetic waves that are transmitted from the terminal device and arrive at a base station device belonging to the network.

5. The terminal device according to claim 1,
wherein the predetermined characteristic relates to a direction in which electromagnetic waves arrive from a base station device belonging to the network.

6. The terminal device according to claim 1,
wherein in response to a request for information on a capability of the terminal device from the network, the terminal device performs notification of the information.

7. A network node comprising:
at least one processor; and
at least one memory that stores a computer-readable instruction for causing, when executed by the at least one processor, the at least one processor to:
acquire, from a terminal device belonging to a network including the network node, information that identifies at least one of, among a plurality of antennas included in the terminal device, a second antenna having a predetermined characteristic in common with a first antenna included in the plurality of antennas, and a third antenna not having the predetermined characteristic in common with the first antenna; and
perform, based on the information, control of communication of the terminal device, the control being the same for the first antenna and the second antenna, and the control being different for the first antenna and the third antenna.

8. The network node according to claim 7,
wherein the network node acquires the predetermined characteristic as well as the information from the terminal device.

9. The network node according to claim 7,
wherein the predetermined characteristic relates to a magnitude of delay observed regarding electromagnetic waves that arrive from a base station device belonging to the network or a magnitude of delay obtained regarding electromagnetic waves that arrive at the base station device from the terminal device, and
the network node performs common transmission power control for the first antenna and the second antenna and performs independent transmission power control for the first antenna and the third antenna.

10. The network node according to claim 7,
wherein the predetermined characteristic relates to a magnitude of delay of electromagnetic waves arriving at the terminal device from a base station device belonging to the network, and
the network node performs common transmission timing control for the first antenna and the second antenna and performs independent transmission timing control for the first antenna and the third antenna.

11. The network node according to claim 7,
wherein the predetermined characteristic relates to a delay spread observed regarding electromagnetic waves that are transmitted from the terminal device and arrive at a base station device belonging to the network, and
the network node performs common sounding reference signal setting for the first antenna and the second antenna and performs independent sounding reference signal setting for the first antenna and the third antenna.

12. The network node according to claim 7,
wherein the predetermined characteristic relates to a direction in which electromagnetic waves transmitted from a base station device belonging to the network arrive at the terminal device, and
the network node performs common beam control for the first antenna and the second antenna and performs independent beam control for the first antenna and the third antenna.

13. The network node according to claim 7,
wherein the network node transmits a request for information on a capability to the terminal device, and acquires the information as a response to the request.

14. A control method to be executed by a terminal device including a plurality of antennas, comprising:
notifying a network to which the terminal device belongs of information that identifies at least one of, among the plurality of antennas, a second antenna having a predetermined characteristic in common with a first antenna included in the plurality of antennas, and a third antenna not having the predetermined characteristic in common with the first antenna.

* * * * *